(No Model.)

M. E. THOMAS & G. C. TWYMAN.
BALL BEARING.

No. 551,239. Patented Dec. 10, 1895.

Witnesses
H. J. S. Duvall
F. D. Blackstone

Inventors:
M. E. Thomas &
G. C. Twyman.

By M. J. Duvall
Attorney

UNITED STATES PATENT OFFICE.

MARTIN E. THOMAS AND GOODLOE C. TWYMAN, OF BOWLING GREEN, KENTUCKY; SAID THOMAS ASSIGNOR TO SAID TWYMAN.

BALL-BEARING.

SPECIFICATION forming part of Letters Patent No. 551,239, dated December 10, 1895.

Application filed August 9, 1895. Serial No. 558,803. (No model.)

*To all whom it may concern:*

Be it known that we, MARTIN E. THOMAS and GOODLOE C. TWYMAN, citizens of the United States, residing at Bowling Green, in the county of Warren and State of Kentucky, have invented certain new and useful Improvements in Ball-Bearings; and we do hereby declare the following to be a full, clear, and exact description of the invention, such as will enable others skilled in the art to which it appertains to make and use the same.

Our invention relates to bearings, and more particularly to that class employing antifriction balls or rollers.

The objects of our invention are to produce a cheap and simple bearing adapted as a whole to be placed upon the market and to be readily applied to the spindle and wheel of any ordinary vehicle and which will receive the inner ends of the spokes thereof in such manner as to increase the bearing of the spokes, thus greatly strengthening the wheel and increasing its durability.

Various other objects and advantages of the invention will hereinafter appear, and the novel features thereof will be particularly pointed out in the claims.

Figure 1:
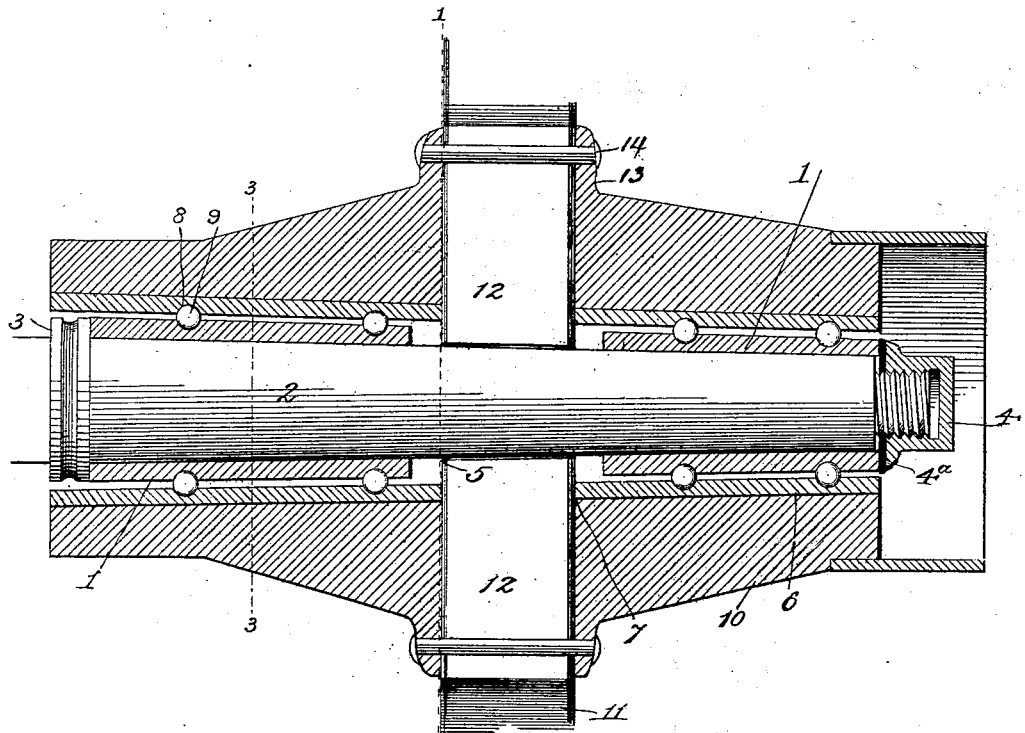
Figure 2:
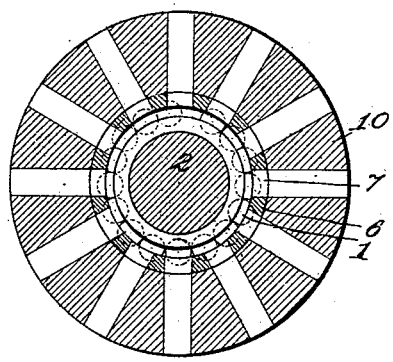
Figure 3:
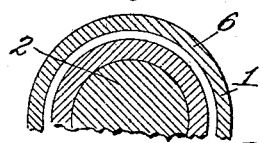

Referring to the drawings, Figure 1 is a vertical longitudinal view through the hub of a vehicle-wheel, the same being provided with a bearing constructed in accordance with our invention and shown in connection with the spindle of an axle. Fig. 2 is a transverse sectional view of the same on the line 1 1 of Fig. 1. Fig. 3 is a similar sectional view on the line 3 3 of Fig. 1.

Like numerals of reference indicate like parts in all the figures of the drawings.

Our improved bearing consists of the pair of inner slightly-tapered sleeve-sections 1, which are so shaped as to fit snugly and immovably upon the axle-spindle 2, and to extend from the collar 3 thereof to a point near the center of the spindle and from the beginning of the usual threads, which are formed for the accommodation of the nut 4, to a similar point at the opposite side of the center of the spindle, and the said nut therefore binds at its inner face against the outer end of the outer sleeve-section. The sleeves, both inner and outer, although shown as tapered, may be cylindrical.

Surrounding the sleeve-sections 1, tapered to conform thereto, and of slightly-greater diameter, so as to form an intermediate annular space, is the external sleeve 6, the same being formed in one piece. The sleeve 6 is provided at about its center and in the same radial plane as the annular space between the sleeve-sections with spoke-receiving openings 7, and the rear end of the sleeve 6 extends over the collar 3 of the spindle. The outer faces of the sleeve-sections 1 and the inner face of the sleeve 6 are, at opposite sides of the said annular space and the series of openings 7, provided with corresponding or registering annular grooves 8, and in these grooves are located antifriction-balls 9, so that, as will be apparent, the outer sleeve is free to revolve around the inner sleeve and the friction is reduced to a minimum. The balls are introduced between the sleeves through suitable openings formed in the outer sleeve, which openings are subsequently closed.

The outer sleeve 6, it will be understood, fits snugly within the usual bore of the wooden or metal hub 10, which is of the ordinary construction, with the exception that the mortises are cut entirely through the same.

11 designates the spokes, and it will be seen that their tenons 12 pass through the mortises of the hub and through the openings 7 of the outer sleeve and into the annular space between the opposing ends of the inner sleeve-section 1 and finally terminate near but do not contact with the spindle of the axle, thus producing between the inner ends of the sections 1 and the spokes annular spaces 5.

If desired the hub may be flanged, as at 13, and rivets 14 passed through the flanges and spokes.

By the construction described it will be seen that the bearing-lengths of the inner or tenoned ends of the spokes are almost doubled, and furthermore that the said inner ends are entered in sockets, as it were, which are formed by the spindle and outer sleeve and which prevents their loosening and increases the durability and rigidity of the wheel as a whole. It will be seen that the inner or tenoned ends of the spokes extend not only through the hub, but also through and beyond the outer sleeve 6, terminating near the spindle. This great amount of spoke thus embraced renders the same very secure.

Having described our invention, what we claim is—

1. The herein described improved bearing, the same consisting of the inner spaced apart opposing sleeve-sections smoothly bored throughout their lengths and adapted to be slipped over a journal producing the intermediate annular spoke-receiving space, and having external annular grooves, the outer integral sleeve surrounding the inner sections and exceeding the same in diameter and having a length equal to the combined length of the sleeve-sections and the intermediate space, and smoothly bored throughout its length and having its inner surface provided with corresponding annular grooves, and between its ends provided with a series of spoke-receiving openings corresponding with the annular space before mentioned as existing between the inner ends of the inner sleeve-sections, and the series of anti-friction balls located in said grooves, substantially as specified.

2. The combination of the spindle having the collar and opposite threaded end, the nut on the latter, the inner, opposite sleeve-sections, the outer end of the section abutting against the nut, the ends of the sleeve-sections adjacent the spokes terminating short of the center of the spindle and producing an intermediate, annular space, the outer surrounding integral sleeve of greater diameter than the inner sleeve and extending over the collar and provided between its ends with spoke receiving openings corresponding to, and of less width than the space between the inner ends of the inner collar-sections, said inner and outer sleeves being provided in their opposing surfaces with a series of annular grooves, anti-friction balls located in the grooves, a surrounding hub having spoke-openings agreeing with those in the outer sleeve, and a series of spokes located in the openings of the outer sleeve and hub and extending into the annular space between the inner collar-sections, substantially as specified.

In testimony whereof we affix our signatures in presence of two witnesses.

MARTIN E. THOMAS.
    GOODLOE C. TWYMAN.

Witnesses:
  JOS. G. COVINGTON,
  C. H. SEARS.